United States Patent [19]
Krieg et al.

[11] Patent Number: 4,996,109
[45] Date of Patent: Feb. 26, 1991

[54] HARD FOAM CORES FOR LAMINATES

[75] Inventors: Manfred Krieg, Darmstadt; Norbert Rau, Sulzbach; Werner Ude, Darmstadt-Arheilgen, all of Fed. Rep. of Germany

[73] Assignee: Röhm GmbH, Darmstadt, Fed. Rep. of Germany

[21] Appl. No.: 387,931

[22] Filed: Jul. 31, 1989

[30] Foreign Application Priority Data

Aug. 4, 1988 [DE] Fed. Rep. of Germany ....... 3826469

[51] Int. Cl.$^5$ .............................................. B32B 3/26
[52] U.S. Cl. .................... 428/304.4; 264/45.3; 428/317.9; 428/323; 428/328; 428/473.5; 521/149
[58] Field of Search .................. 428/304.4, 317.9, 323, 428/328, 473.5; 264/45.3; 521/149

[56] References Cited

U.S. PATENT DOCUMENTS

| | | | |
|---|---|---|---|
| 4,139,685 | 2/1979 | Schroeder | 521/88 |
| 4,187,353 | 2/1980 | Schroeder | 521/149 |
| 4,205,111 | 5/1980 | Pip et al. | 428/215 |
| 4,316,934 | 2/1982 | Maier et al. | 428/308.4 |
| 4,493,788 | 1/1985 | Fujio et al. | 521/143 |
| 4,865,784 | 9/1989 | Hill | 428/317.9 |

FOREIGN PATENT DOCUMENTS

| | | |
|---|---|---|
| 0079080 | 5/1983 | European Pat. Off. . |
| 0105384 | 4/1984 | European Pat. Off. . |
| 0186887 | 7/1986 | European Pat. Off. . |
| 0223615 | 5/1987 | European Pat. Off. . |
| 2726259 | 12/1978 | Fed. Rep. of Germany . |
| 3304882 | 8/1984 | Fed. Rep. of Germany . |
| 1083960 | 9/1967 | United Kingdom . |

*Primary Examiner*—William J. Van Balen
*Attorney, Agent, or Firm*—Curtis, Morris & Safford

[57] ABSTRACT

Rigid foamed polymethacrylimide synthetic resin containing from 0.1 to 10 percent by weight of electrically conductive particles such as conductive carbon black exhibit improved properties when used in rapidly flowing streams of gases, are particularly suitable for use as a core material in laminates for aircraft construction, and are prepared by heating a copolymer of methacrylic acid and methacrylonitrile containing a blowing agent and conductive particles.

9 Claims, No Drawings

HARD FOAM CORES FOR LAMINATES

The present invention relates to a rigid foamed polymethacrylimide synthetic resin suitable for use as a core material for laminates, particularly in the construction of aircraft, and to a method for making the same.

Rigid foamed polymethacrylimide synthetic resins are known to be used as a core material for laminates or foamed plastic compositions. (See, for example, German patent publications Nos. 28 22 885 and 33 04 882, and U.S. Pat. No. 4,316,934.) When such laminates are employed in rapidly flowing gases, as in aircraft construction for example, material defects such as delaminations or swelling have occasionally been observed which could not be attributed to mechanical stresses.

The present invention has as its object to investigate and eliminate the cause of such material defects. It has found that these will not occur if the rigid foamed polymethacrylimide plastic contains from 0.1 to 10 percent by weight of electrically conductive particles. From this it was inferred that these material defects were caused by lightning-like electrical discharges due to electrostatic charges on the surface of the laminate. The polymethacrylimide rigid foamed plastics which contain, say, 2 percent by weight of conductive carbon black, have a surface resistivity from $10^3$ to $10^8$ ohms, which is sufficient for the dissipation of electrostatic charges.

It is known to introduce conductive carbon black or other electrically conductive particles into foamed plastics to render them conductive. Such foamed plastics are used as packaging material for electronic components or similar objects which are sensitive to electric discharges. Carbon black-filled foamed plastics are also used as a shield against electromagnetic radiation. The foamed plastics described in European patent publications Nos. 79,080, 105,384, 186,887 and 223,615 and in U.S. Pat. No. 4,493,788 contain from 5 to 40, and actually mostly from 10 to 20, percent by weight of conductive carbon black embedded in a matrix of a bulk resin such as polystyrene, polyethylene or polyurethane. However, the important properties of polymethacrylimide foamed plastics would be lost with carbon-black contents exceeding 10 percent by weight.

Up to now there has been no point in loading a high-quality structural rigid foamed plastic such as polymethacrylimide foam with conductive particles because it is not used for packaging purposes or as a shielding material against radiation.

In these uses, it is of no consequence whether the mechanical properties are impaired by the high loading with conductive additives. In contrast thereto, the polymethacrylimide rigid foamed plastics of the invention should substantially retain their good mechanical and thermal properties, such as compressive strength, high-temperature creep resistance and deflection (heat-distortion) temperature also with the addition of conductive particles since these properties are essential when these foams are used as core material for laminates. Surprisingly, it has been found that the polymethacrylimide rigid foamed plastic can develop a resistivity of $10^6$ ohm-cm even with a very low content of conductive carbon black, for example, 1.6 percent by weight. This conductive material content has proved sufficient for the dissipation of harmful electrostatic charges and for the prevention of the material defects mentioned at the outset. The mechanical and thermal properties of the foamed plastic are not significantly affected thereby.

Polymethacrylimide rigid foamed plastics are characterized by repeating units of the structure

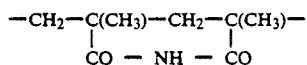

which account for more than 50, and preferably for from 60 to 90, percent by weight of the units of the polymer. These units form on heating to 150°–250° C. from vicinal units of methacrylic acid and methacrylonitrile through a cyclizing isomerization reaction. (See German patent publications Nos. 27 26 259 and 27 26 260.) Processes for the production of polymethacrylimide rigid foamed plastics by free-radical polymerization of a mixture which contains methacrylic acid and methacrylonitrile as monomers, as well as a blowing agent which on heating evolves gas, and heating of the polymer so produced until a polymethacrylimide rigid foamed plastic is formed are known.

The inventive polymethacrylimide rigid foamed plastics are produced by adding to the mixture which is to be polymerized, or has already been partially polymerized, from 0.1 to 10 percent by weight of electrically conductive particles. These may be in the form of powders or fibers. Their particle size may range from 10 nm to 10 mm. They may be metal, such as aluminum, nickel, iron alloys, titanium or tin, metallized nonconductors such as nickel-coated mica, carbon in the form of graphite or so-called conductive carbon black, or known semiconductors. Highly conductive carbon blacks, which are on the market as conductive blacks, for example, under the trademark Ketjenblack ® EC of Akzo Chemie, are particularly preferred. They have an ash content of less than 1 percent and a pore volume of between 300 and 600 cm$^3$/100 g. Their bulk density may range from 100 to 250 kg/m$^3$, for example, and their specific surface (BET, N$_2$) from 50 to 2,000 m$^2$/g. Average particle size is 30 nanometers.

The amount of electrically conductive particles which the rigid foamed plastic should contain to prevent the aforesaid defects depends primarily on the quality of the conductive material, in some measure on the density of the foamed plastic, and to a lesser extent on the thickness of the rigid foam layer in a laminate. A content of 10 percent by weight is rarely necessary. As a rule, amounts ranging from 0.5 to 5 percent by weight will suffice. Particularly preferred is the range from 1 to 3 percent by weight.

In many cases, the effectiveness of the electrically conductive particles introduced will depend on other factors and measures taken during the polymerization. Their effectiveness will be enhanced if the mixture being polymerized remains as nearly homogeneous as possible during the polymerization. In many cases the mixture will have a tendency to separate into its constituents, which is attributable to insolubility in the residual monomers of the polymer already formed. This demixing tendency can be suppressed by including in the mixture styrene and/or a cyclic derivative of maleic acid as comonomers. Suitable derivatives are maleic anhydride and maleic imides, which may be unsubstituted on the nitrogen atom or substituted with lower alkyl groups such as methyl or with aryl groups such as phenyl. Such comonomers may represent from 10 to 30 percent by weight, for example, based on the total weight of polymerizable monomers. In this case, formamide and/or lower alcohols may be used as blowing agents.

The lower alcohols, in other words, alcohols having up to 8 carbon atoms, will also be conducive to homogeneity of the mixture. Preferred are secondary and tertiary alcohols having from 3 to 8 carbon atoms, such as isopropyl alcohol or tert-butyl alcohol. They are preferably used in amounts of from 1 to 15 percent by weight, based on the weight of polymerizable monomers.

Minor amounts of crosslinking agents such as allyl acrylate or methacrylate, ethylene glycol diacrylate or dimethacrylate, or polyvalent metallic salts of acrylic or methacrylic acid, such as magnesium methacrylate, may advantageously be used as further comonomers in amounts ranging from 0.05 to 1 percent by weight, for example.

It has further proved advantageous, and in many cases essential, to vigorously mix before the onset of polymerization the polymerizable mixture with which electrically conductive particles have been admixed. This can be accomplished by means of so-called homogenizers or dispersers, for example, comprising a rapidly rotating agitator. A widely used machine of this type is marketed by Janke & Kunkel GmbH & Co KG under the name Ultraturrax ®. Characteristic of such machines is a high-frequency rotor-stator system which subjects the agitated liquid to high shear. It has been found that the vigorous agitation militates against the accumulation of electrically conductive particles in nonconducting agglomerates.

Polymerization of the mixture is carried out conventionally in flat layers from 10 to 40 mm thick, for example, in a flat chamber formed by two glass sheets separated by a peripheral gasket strip. The polymerization is initiated by immersing the chamber in a water bath of from 30° to 60° C. under the action of a free-radical-forming initiator dissolved in the mixture and is usually completed by subsequent heating to 60°-120° C. The polymerization time generally ranges from 20 to 150 hours. A platelike polymer is obtained which on being heated to 180°-250° C. will expand in from 1 to 5 hours to a polymethacrylimide rigid foamed plastic having a density of between 30 and 300 kg/m$^3$.

Conductivity measurements on the foamed plastic obtained, with a conductive carbon-black content of from 1 to 2 percent by weight, have shown a surface resistivity of less than $3 \times 10^7$ ohms, and preferably of $10^5 - 2 \times 10^6$ ohms, and a volume resistivity of from $6 \times 10^5$ to $10^9$ ohm-cm or a conductivity of over $10^{-6}$ mhos/cm.

For the production of laminates, plates from 1 to 100 mm thick, for example, are cut from the foamed plastic slab and laminated on one side or, preferably, on both sides with a top layer. Suitable for use as top layers are metal foils and sheets, plastic sheeting, and fiber-reinforced plastic layers. As a rule, the top layers will be thinner than the polymethacrylimide rigid foamed plastic core layer and have a thickness of from 0.1 to 5 mm, for example. Previously prepared top layers can be applied to the foamed plastic with suitable adhesives. Fiber-reinforced layers are preferably produced by the so-called prepreg technique. To this end, a fiber-containing layer of a thermosetting synthetic resin is pressed onto the foamed plastic layer and cured under pressure and heat and at the same time bonded to the foamed plastic. Because of their pressure and heat resistance, the polymethacrylimide rigid foamed plastics lend themselves well to this technique. With regard to the laminating technique, reference is made to German patent publications Nos. 28 22 885 and 33 04 882 as well as U.S. Pat. No. 4,316,934.

Laminates of this type are suitable for use as light-weight structural elements even under high mechanical stresses and if desired at elevated operating temperatures of up to 160° C. Typical fields of application are aircraft construction, the aerospace industry, wind-tunnel components and internals, and generally all applications where mechanically stressed parts are in contact with rapidly flowing gases.

In the practical examples which follow, the production of polymethacrylimide rigid foamed plastics containing electrically conductive particles is described, and the surface resistivity and volume resistivity are given in each case. The quantities used are given in parts by weight.

EXAMPLE 1

A mixture of 56.2 parts of methacrylic acid, 43.8 parts of methacrylonitrile, 4 parts of isopropanol, 0.2 part of allyl methacrylate and 1.6 parts of conductive carbon black (Ketjenblack ® 600 EC, a product of Akzo Chemie) is stirred with a rapidly rotating agitator (Ultraturrax ® of Janke & Kunkel) with vigorous shearing action until it has heated to 50° C. After cooling, 0.05 part of azo-bis-isobutyronitrile is admixed and the mass is filled into a flat chamber with an inside diameter of 30 mm formed by two glass disks separated by a peripheral gasket strip. The flat chamber is heated in a water bath for 70 hours to 45° C. and in a drying oven for another 13 hours to 115° C. A polymer plate 25 mm thick is obtained which on being heated for 2 hours to 230° C. expands to a foamed plastic with a density of 70 kg/m$^3$.

Surface resistivity: $10^6$ ohms.
Volume resistivity: $10^7$ ohm-cm.

EXAMPLE 2

The same procedure is followed as in Example 1, except that the polymer plate is heated to 200° C. for foaming. A foamed plastic with a density of 190 kg/m$^3$ is obtained.

Surface resistivity: $10^6$ ohms.
Volume resistivity: $10^7$ ohm-cm.

EXAMPLE 3

The following mixture is prepared and polymerized by the procedure described in Example 1: 52.5 parts of methacrylic acid, 22.5 parts of methacrylonitrile, 15 parts of styrene, 10 parts of maleic anhydride, 0.4 part of allyl methacrylate, 1 part of formamide, and 1.5 part of conductive carbon black (Ketjenblack ® 600 EC, a product of Akzo Chemie).

When the polymer plate produced is heated for 2 hours to 200° C., a foamed plastic having a density of 65 kg/m$^3$ is obtained.

Surface resistivity: $10^5$ ohms.
Volume resistivity: $10^6$ ohm-cm.

EXAMPLE 4

By the procedure of Example 3 but using 2.2 parts of conductive carbon black and heating to 210° C., a foamed plastic having a density of 69 kg/m$^3$ is produced.

Surface resistivity: $10^4$ ohms.

EXAMPLE 5

A mixture of 52.5 parts of methacrylic acid, 22.5 parts of methacrylonitrile, 10 parts of styrene, 15 parts of phenylmaleimide, 0.3 part of allyl methacrylate, 1 part of formamide and 1.5 parts of conductive carbon black (Ketjenblack ® 600 EC, a product of Akzo Chemie) is processed by the procedure of Example 1 and on heating to 195° C. of the polymer plate produced from it yields a foamed plastic having a density of 98 kg/m$^3$.

Surface resistivity: $10^5$ ohms.

EXAMPLE 6

The following mixture is processed by the procedure of Example 1: 50 parts of methacrylic acid, 50 parts of methacrylonitrile, 5 parts of isopropanol, 0.2 part of allyl methacrylate and 1.6 parts of conductive carbon black (Ketjenblack ® 600 EC, a product of Akzo Chemie).

When the polymer plate so produced is heated to 240° C., a foamed plastic having a density of 85 kg/m$^3$ is obtained.

Surface resistivity: $10^5$ ohms.
Volume resistivity: $10^5$ ohm-cm.

EXAMPLE 7

The following mixture is processed by the procedure of Example 1: 56.2 parts of methacrylic acid, 43.8 parts of methacrylonitrile, 4 parts of isopropanol, 0.07 part of allyl methacrylate, 1.6 parts of conductive carbon black (Ketjenblack ® 600 EC, a product of Akzo Chemie), and 5 parts of carbon fibers (Sigrafil ®, a product of Sigri). When the polymer plate so produced is heated to 210° C., a foamed plastic having a density of $10^5$ kg/m$^3$ is obtained.

Surface resistivity: $10^4$ ohms.

EXAMPLE 8

In a flat chamber formed by two glass sheets measuring 50×50 cm and separated by a peripheral gasket strip 22 mm high, two layers, each 5 cm thick, of a very fluffy, compressible nonwoven fabric made of polyester fibers and metal fibers of stainless steel are inserted. The two layers of nonwoven together contain 150 g of metal fibers. A mixture of 2.81 kg of methacrylic acid and 2.19 kg of methacrylonitrile, 5 g of tert-butyl peroxypivalate, 2.5 g of dibenzoyl peroxide, 1.625 kg of isopropanol and 1.375 kg of tert-butanol is then filled into the chamber, which is then tightly closed.

For polymerization, the flat chamber is kept immersed in a water bath of 48° C. for 3 days and then heated for 3 hours in a drying oven to 115° C. The platelike polymer is then removed from the flat chamber and foamed by heating for 3 hours to 240° C. Expansion is significantly greater perpendicularly to the plane of the plate than in the direction of the plane of the plate. The foamed plastic so produced has a density of 150 kg/m$^3$.

Surface resistivity: $2 \times 10^5$ ohms.
Volume resistivity: $10^3$ ohm-cm.

In the preparation of the plate, the polyester fibers serve uniformly to distribute the metal fibers (which are mostly between 2 and 6 cm in length) throughout the finished product. The polyester dissolves in the liquid monomers when the polymerization chamber is warmed so that the finished plate simply comprises the metal fibers, primarily oriented parallel to the plane of the plate, dispersed throughout the polymerized resin. It is this orientation of the fibers which is believed responsible for the anisotropic expansion of the resin on foaming. In the foam, the metal fibers form a network of conducting paths.

EXAMPLE 9

An aluminum plate, 400 mm×400 mm and 0.8 mm thick is degreased with acetone and roughened on one side by sand blasting. A plate of the electrically conductive foam of Example 1, of equal size but 30 mm thick, is coated on one side with 200 gm/m$^2$ of a commercial epoxy resin adhesive which has been made electrically conductive by the addition of particles of carbon black. The roughened side of the aluminum plate is mated with the adhesive coated side of the foam plate and placed in a press which can be heated and cooled. The adhesive is hardened at 180° C. for 20 minutes under a pressure of 0.18 Newtons/mm$^2$ and the laminate is subsequently cooled to room temperature under pressure and is then removed from the press.

Instead of the aluminum plate, a sheet of fiber-reinforced synthetic resin 2 mm thick can be used. A suitable sheet comprises glass fibers and a hardened epoxy resin which is filled with conductive carbon black.

What is claimed is:

1. A rigid foamed polymethacrylimide synthetic resin comprising from 0.1 to 10 percent by weight of electrically conductive particles.

2. A rigid foamed resin as in claim 1 wherein said electrically conductive particles range in size from 10 nanometers to 10 millimeters.

3. A rigid foamed resin as in claim 1 wherein said electrically conductive particles are particles of conductive carbon black.

4. A rigid foamed resin as in claim 1 in the form of a sheet or board which is from 1 millimeter to 100 millimeters thick.

5. A method for making a rigid foamed polymethacrylimide synthetic resin which comprises free radically copolymerizing a mixture of monomers of methacrylic acid and methacrylonitrile to form a copolymer, said mixture further comprising a blowing agent evolving gas when heated and from 0.1 to 10 percent, by weight of said copolymer, of electrically conductive particles, and then heating said copolymer to form and foam said rigid polymethacrylimide resin.

6. A method as in claim 5 wherein said blowing agent is a lower aliphatic alcohol.

7. A method as in claim 5 wherein said mixture, prior to polymerization, is agitated at high frequency with a rotor-stator mixer.

8. A method as in claim 5 wherein said mixture additionally comprises a monomer selected from the group consisting of styrene and cyclic derivatives of maleic acid.

9. A laminate comprising a core layer of a rigid foamed polymethacrylimide synthetic resin as in claim 1 and at least one further layer bonded to at least one side of said core layer.

* * * * *